(12) United States Patent
Barkley et al.

(10) Patent No.: US 9,247,415 B2
(45) Date of Patent: Jan. 26, 2016

(54) GLOBAL PLATFORM FOR MANAGING SUBSCRIBER IDENTITY MODULES

(71) Applicant: Jasper Technologies, Inc., Mountain View, CA (US)

(72) Inventors: Scott Barkley, San Mateo, CA (US); Amit Gupta, Livermore, CA (US); Daniel G. Collins, Plano, TX (US); Jahangir Mohammed, Saratoga, CA (US)

(73) Assignee: Jasper Technologies, Inc., Santa Clara, CA (US)

( * ) Notice: Subject to any disclaimer, the term of this patent is extended or adjusted under 35 U.S.C. 154(b) by 0 days.

(21) Appl. No.: 14/543,629

(22) Filed: Nov. 17, 2014

(65) Prior Publication Data

US 2015/0072682 A1  Mar. 12, 2015

Related U.S. Application Data

(63) Continuation of application No. 14/146,401, filed on Jan. 2, 2014, now Pat. No. 8,897,776, which is a continuation of application No. 13/622,172, filed on Sep. 18, 2012, now Pat. No. 8,626,164, which is a
(Continued)

(51) Int. Cl.
*H04W 4/00* (2009.01)
*H04W 8/06* (2009.01)
(Continued)

(52) U.S. Cl.
CPC .............. *H04W 8/06* (2013.01); *H04L 63/0428* (2013.01); *H04L 63/0853* (2013.01); *H04W 4/24* (2013.01);
(Continued)

(58) Field of Classification Search
CPC ....... H04W 4/24; H04W 4/001; H04W 12/08; H04W 8/02; H04W 28/12; H04W 12/06; H04W 88/02; H04W 88/10; H04W 8/06

USPC ........................................................ 455/435.1
See application file for complete search history.

(56) References Cited

U.S. PATENT DOCUMENTS 5,353,340 A  10/1994  Kunz
5,379,423 A   1/1995  Mutoh et al.
(Continued)

FOREIGN PATENT DOCUMENTS

EP  1229751 A1  8/2002
EP  1392077 A1  2/2004
(Continued)

OTHER PUBLICATIONS

ETSI TS 100 922 v7.1.1 (Jul. 1999) Digital Cellular Telecommunication Systems (Phase 2+); Subscriber Identity Modules (SIM) (GSM 02.17 version 7.1.1. Release 1998).
(Continued)

*Primary Examiner* — Kwasi Karikari
(74) *Attorney, Agent, or Firm* — Blakely Sokoloff Taylor & Zafman, LLP

(57) ABSTRACT

A method of operating a mobile wireless network comprising: receiving, by a provisioning server, a signal from a mobile wireless network specifying a location of a first mobile device having a first International Mobile Subscriber Identity (IMSI) and operating in the mobile wireless network under a first condition, the mobile wireless network including a plurality of mobile switching centers (MSCs) and a plurality of mobile devices operating in the mobile wireless network; provisioning the first IMSI in the first HLR based on a state transition rule from a first provisioning state to a second provisioning state; provisioning a second IMSI in the first HLR based on the state transition rule from a third provisioning state to the first provisioning state; and transmitting data identifying the second IMSI to the first mobile device to allow the first mobile device to operate in the mobile wireless network under a second condition.

12 Claims, 11 Drawing Sheets

Related U.S. Application Data continuation of application No. 13/340,997, filed on Dec. 30, 2011, now Pat. No. 8,275,357, said application No. 14/543,629 is a continuation of application No. 11/119,401, filed on Apr. 29, 2005, now Pat. No. 8,346,214, and a continuation of application No. 11/398,493, filed on Apr. 4, 2006, now Pat. No. 8,498,615, and a continuation of application No. 11/804,582, filed on May 18, 2007, now Pat. No. 8,745,184.

(51) Int. Cl.
| | | |
|---|---|---|
| *H04L 29/06* | (2006.01) | |
| *H04W 4/24* | (2009.01) | |
| *H04W 48/18* | (2009.01) | |
| *H04W 8/18* | (2009.01) | |
| *H04W 8/02* | (2009.01) | |
| *H04W 8/12* | (2009.01) | |
| *H04W 8/20* | (2009.01) | |
| *H04W 12/06* | (2009.01) | |
| *H04W 8/26* | (2009.01) | |
| *H04W 12/04* | (2009.01) | |

(52) U.S. Cl.
CPC ........ *H04W 8/02* (2013.01); *H04W 8/12* (2013.01); *H04W 8/183* (2013.01); *H04W 8/205* (2013.01); *H04W 48/18* (2013.01); *H04M 2215/2026* (2013.01); *H04M 2215/32* (2013.01); *H04W 4/00* (2013.01); *H04W 8/26* (2013.01); *H04W 12/04* (2013.01); *H04W 12/06* (2013.01)

(56) References Cited

U.S. PATENT DOCUMENTS

| | | | |
|---|---|---|---|
| 5,734,699 A | 3/1998 | Lu et al. | |
| 5,854,982 A | 12/1998 | Chambers et al. | |
| 5,943,619 A | 8/1999 | Coyne et al. | |
| 6,124,799 A | 9/2000 | Parker | |
| 6,584,310 B1 | 6/2003 | Berenzweig | |
| 6,997,379 B2 | 2/2006 | Boyce et al. | |
| 7,027,813 B2 | 4/2006 | Hicks et al. | |
| 7,184,768 B2 | 2/2007 | Hind et al. | |
| 7,190,969 B1 | 3/2007 | Oh et al. | |
| 7,266,371 B1 | 9/2007 | Amin et al. | |
| 7,274,933 B2 | 9/2007 | Zinn et al. | |
| 7,366,510 B2 | 4/2008 | Gunaratnam et al. | |
| 7,395,083 B2 | 7/2008 | Buckley | |
| 7,668,573 B2 | 2/2010 | Laroia et al. | |
| 7,676,552 B2 | 3/2010 | Eilam et al. | |
| 7,788,352 B2 | 8/2010 | Breuer et al. | |
| 7,987,449 B1 | 7/2011 | Marolia et al. | |
| 8,112,549 B2 | 2/2012 | Srinivasan et al. | |
| 8,149,749 B2 | 4/2012 | Maeda et al. | |
| 8,745,184 B1 * | 6/2014 | Barkley et al. | ........... 709/223 |
| 2002/0154632 A1 | 10/2002 | Wang et al. | |
| 2002/0197991 A1 * | 12/2002 | Anvekar | ........ H04W 8/183 |
| | | | 455/431.1 |
| 2003/0002269 A1 | 1/2003 | Keating et al. | |
| 2003/0022689 A1 | 1/2003 | McElwain et al. | |
| 2003/0027581 A1 | 2/2003 | Jokinen et al. | |
| 2003/0041131 A1 | 2/2003 | Westerinen et al. | |
| 2003/0064723 A1 | 4/2003 | Thakker | |
| 2003/0157935 A1 | 8/2003 | Kauhanen | |
| 2004/0023744 A1 | 2/2004 | Raghavan et al. | |
| 2004/0043752 A1 | 3/2004 | Matsumura | |
| 2004/0097230 A1 | 5/2004 | Natarajan et al. | |
| 2004/0203744 A1 | 10/2004 | Hicks et al. | |
| 2005/0037755 A1 | 2/2005 | Hind et al. | |
| 2005/0079863 A1 | 4/2005 | Macaluso | |
| 2005/0097230 A1 | 5/2005 | Hsu | |
| 2005/0097595 A1 | 5/2005 | Lipsanen et al. | |
| 2005/0113088 A1 | 5/2005 | Zinn et al. | |
| 2005/0255880 A1 | 11/2005 | Inoue | |
| 2006/0019647 A1 | 1/2006 | Muhonen et al. | |
| 2006/0030315 A1 | 2/2006 | Smith et al. | |
| 2006/0058028 A1 | 3/2006 | Allison et al. | |
| 2006/0173976 A1 | 8/2006 | Vincent et al. | |
| 2006/0205434 A1 * | 9/2006 | Tom | ........ H04W 8/26 |
| | | | 455/558 |
| 2007/0026861 A1 | 2/2007 | Kuhn et al. | |
| 2007/0083528 A1 | 4/2007 | Matthews et al. | |
| 2009/0029684 A1 | 1/2009 | Rosenblatt et al. | |
| 2009/0149175 A1 | 6/2009 | Lopresti et al. | |
| 2010/0121736 A1 | 5/2010 | Kalke | |

FOREIGN PATENT DOCUMENTS

| | | |
|---|---|---|
| EP | 1672945 A1 | 6/2006 |
| FR | 2790161 A1 | 8/2000 |
| FR | 2814029 A1 | 3/2002 |
| GB | 2389745 A | 12/2003 |
| WO | 0070900 A1 | 11/2000 |
| WO | 0137602 A1 | 5/2001 |
| WO | 0221872 A1 | 3/2002 |
| WO | 02067563 A1 | 8/2002 |

OTHER PUBLICATIONS

3GPP TS 03.20 V9.0.0 (Jan. 2001) 3rd Generation Partnership Project; Digital Cellular Telecommunications System (Phase 2+) Security related network functions (Release 2000).

* cited by examiner

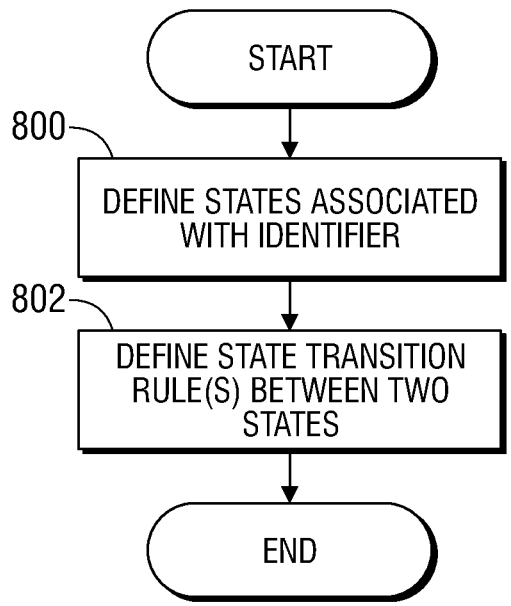
FIG. 8
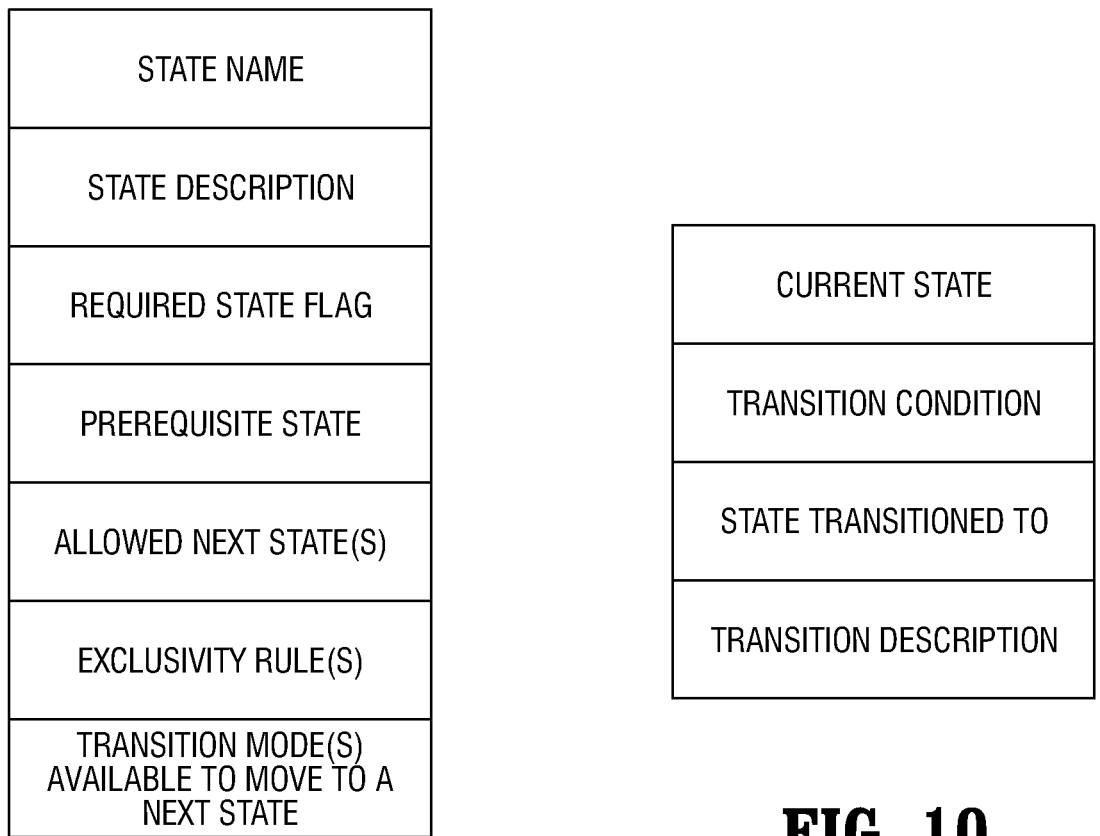
FIG. 9
FIG. 10

GLOBAL PLATFORM FOR MANAGING SUBSCRIBER IDENTITY MODULES

CROSS-REFERENCE TO RELATED APPLICATIONS

This application is a continuation of U.S. patent application Ser. No. 14/146,401 entitled GLOBAL PLATFORM FOR MANAGING SUBSCRIBER IDENTITY MODULES filed on Jan. 2, 2014, which is a continuation of Ser. No. 13/622,172 entitled GLOBAL PLATFORM FOR MANAGING SUBSCRIBER IDENTITY MODULES filed on Sep. 18, 2012, which is a continuation of U.S. patent application Ser. No. 13/340,997 entitled GLOBAL PLATFORM FOR MANAGING SUBSCRIBER IDENTITY MODULES filed on Dec. 30, 2011, now U.S. Pat. No. 8,275,357, issued on Sep. 25, 2012, co-pending U.S. patent application Ser. No. 11/119, 401 entitled SELF PROVISIONING OF WIRELESS TERMINALS IN CELLULAR NETWORKS filed Apr. 29, 2005, now issued as U.S. Pat. No. 8,346,214, issued on Jan. 1, 2013, co-pending U.S. patent application Ser. No. 11/398,493 entitled SELF PROVISIONING OF WIRELESS TERMINALS IN WIRELESS NETWORKS filed Apr. 4, 2006, now issued as U.S. Pat. No. 8,498,615, issued on Jul. 30, 2013, and co-pending U.S. patent application Ser. No. 11/804,582 entitled WIRELESS COMMUNICATION PROVISIONING USING STATE TRANSITION RULES filed May 18, 2007 and issued as U.S. Pat. No. 8,745,184 on Jun. 3, 2014.

BACKGROUND OF THE INVENTION

In a wireless system, the wireless terminal has a Subscriber Identity Module (SIM), which contains the identity of the subscriber. One of the primary functions of the wireless terminal with its SIM in conjunction with the wireless network system is to authenticate the validity of the wireless terminal (for example, a cell phone) and the wireless terminal's subscription to the network. The SIM is typically a microchip that is located on a plastic card, a SIM card, which is approximately 1 cm square. The SIM card is then placed in a slot of the wireless terminal to establish the unique identity of the subscriber to the network. In some cases, the wireless terminal itself contains the subscriber identification and authentication functionality so that a separate SIM and/or SIM card is not utilized.

In the SIM (or within the wireless terminal) an authentication key and a subscriber identification pair are stored. An example of such a pair would be the authentication key Ki as used in GSM networks and the associated subscriber identification IMSI (International Mobile Subscriber Identity). Another example would be the authentication key A-Key and subscriber identification MIN (Mobile Identification Number) as used in CDMA and TDMA networks. In either case, a corresponding identical set of an authentication key and a subscriber identification are stored in the network. In the SIM (or in the wireless terminal) and within the network, the authentication functionality is run using the local authentication key and some authentication data which is exchanged between the SIM and the network. If the outcomes of running the authentication functionality in the SIM and in the network leads to the same result, then the SIM/wireless terminal are considered to be authenticated for the wireless network.

In existing wireless systems, a SIM (or wireless terminal) has an authentication key associated with only one subscriber identification and this subscriber identity is typically tied to a local region or network. When a SIM (or wireless terminal) authenticates in a region that is not local or with a network that is not local, then usually the SIM (or wireless terminal) needs to pay additional roaming service charges to connect with the wireless network. It would be beneficial if the SIM (or wireless terminal) were not tied to a local region or network. For example, equipment vendors would then be able to sell the same equipment in multiple regions and for multiple networks. Additionally, end users may avoid roaming service charges or at least more favorable subscription terms may be available.

BRIEF DESCRIPTION OF THE DRAWINGS

Various embodiments of the invention are disclosed in the following detailed description and the accompanying drawings.

FIG. 8 is a flow diagram illustrating an embodiment of a process for mobile data communication provisioning.

FIG. 9 is a block diagram illustrating an embodiment of a state definition.

FIG. 10 illustrates an embodiment of a state transition rule definition.

DETAILED DESCRIPTION

Figure 1:
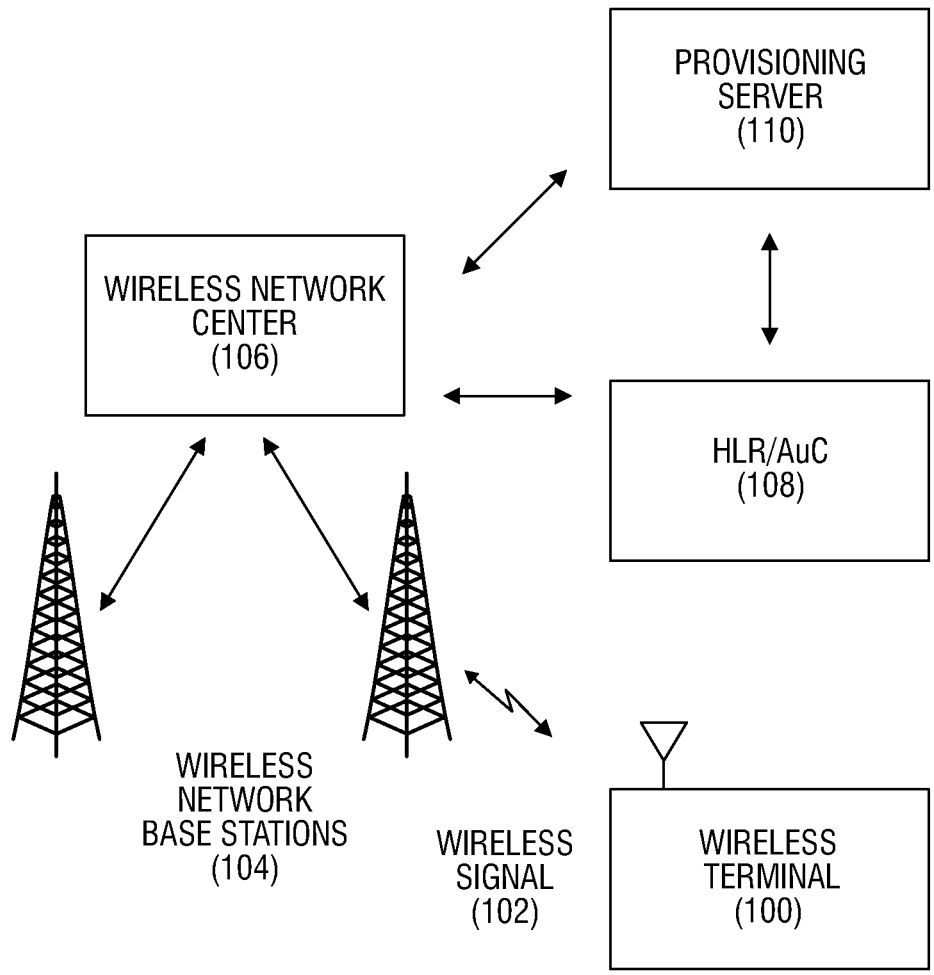
FIG. 1 illustrates an embodiment of a self-provisioning wireless system.

The invention can be implemented in numerous ways, including as a process, an apparatus, a system, a composition of matter, a computer readable medium such as a computer readable storage medium or a computer network wherein program instructions are sent over optical, electronic or wireless communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task.

In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Provisioning of Subscriber Identifications to Wireless Terminals in Wireless Networks A system and method for provisioning a subscriber identification to a wireless terminal in a wireless network is disclosed. A control center receives transmission from a wireless network. The transmission indicates that a wireless terminal is roaming. The control center provisions a subscriber identification to the wireless terminal, where the subscriber identification is selected based at least in part on the identification of the wireless network in which the wireless terminal is roaming. Using the newly-provisioned subscriber identification, the wireless terminal acquires wireless service from the wireless network as a local wireless terminal. The wireless terminal can operate as a local wireless terminal for that network, or for a network with which the local network has a preferred relationship. The wireless terminal can acquire telecommunications service as a local terminal by using a stored set of authentication key-subscriber identification that is specific to the network it is operating in. In various embodiments, the wireless terminal can operate as a local terminal by receiving or downloading a specific set of authentication key-subscriber identification, or by receiving or downloading a subscriber identification to pair with an existing authentication key.

FIG. 1 illustrates an embodiment of a wireless system. In the example shown, the wireless system includes a plurality of wireless terminals, represented in FIG. 1 by wireless terminal 100, a plurality of wireless network base stations, represented by wireless network base stations 104, wireless network center 106, Home Location Register/Authentication Center (HLR/AuC) 108, and provisioning server 110 capable of provisioning the wireless terminals. Although only one wireless network center 106 is shown, it is understood that the wireless system can include multiple wireless network centers 106. Each wireless network center 106 includes, or is associated with, a HLR, a Mobile Switching Center/Visitor Location Register (MSC/VLR) and a Serving GPRS Service Node (SGSN), or Packet Data Serving Node (PDSN). In one embodiment, the multiple wireless centers 106 may be operated by different network carriers, while HLR/AuC 108 and provisioning server 110 are operated by a global platform provider. Wireless terminal 100 includes a Subscriber Identity Module (SIM) which is either an attachable hardware card with a memory and a processor or a software object embedded in the wireless terminal. Wireless terminal 100 communicates with wireless network base stations 104 using wireless signal 102. As a wireless terminal moves around it communicates with different wireless base stations. Wireless network base stations 104 communicate with wireless network center 106.

Communications from a wireless terminal are passed to another wireless terminal over the same wireless network using a local wireless network base station to the other wireless terminal or the communications are carried by a wired network or other wireless network to the destination terminal. Wireless network center 106 communicates with its associated HLR, where sets of authentication key-subscriber identification are stored, to help in authenticating a wireless terminal that is acquiring wireless network service. One example of a subscriber identification is an international mobile subscriber identifier (IMSI). Wireless network center 106 and its associated HLR communicate with provisioning server 110 to enable a wireless terminal to acquire a new subscriber identification that is paired with an existing authentication key and/or a new set of authentication key-subscriber identification. In some embodiments the transmission of the authentication key or the authentication key-subscriber identification is encrypted. In various embodiments, the authentication key or the authentication key-subscriber identification is/are decrypted at the wireless terminal and/or in the SIM card. The old authentication key-new subscriber identification pair and/or the new set of authentication key-subscriber identification are added in the appropriate manner to the HLR/AuC 108 databases or the HLR databases associated with wireless network centers 106 so that the wireless terminal can be authenticated and can acquire wireless network service using the new subscriber identification and/or authentication key set. In various embodiments, the wireless network system is a cellular system, a GSM/GPRS wireless system, a CDMA or WCDMA wireless system, or a TDMA wireless system, or any other type of wireless network system.

Figure 2A:
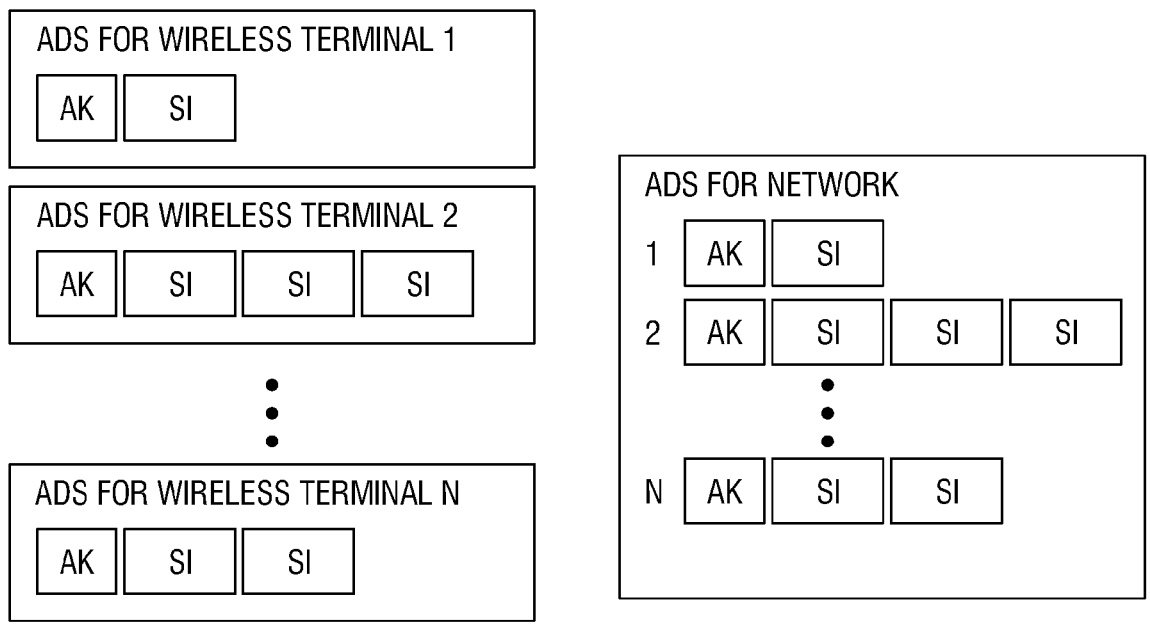
FIG. 2A illustrates an example of authentication data structures in one embodiment.

FIG. 2A illustrates an example of authentication data structures in one embodiment. In some embodiments, the authentication data structure for a wireless terminal is located in the SIM, and for the network in the HLR/AuC such as HLR/Auc 108 of FIG. 1 or the HLR associated with wireless network centers 106. An authentication data structure (ADS) for a wireless terminal includes an authentication key (AK) and one or more subscriber identifications (SI) and is used to help authenticate a wireless terminal for a wireless network. In the example shown, the ADS for wireless terminal 1 includes one authentication key and one subscriber identification. The ADS for wireless terminal 2 includes one authentication key and three subscriber identifications. The ADS for wireless terminal N includes one authentication key and two subscriber identifications. The ADS for network includes the authentication key-subscriber identification entries for each of the wireless terminals. Entries for wireless terminal 1, 2, and N are shown. In some embodiments, there are more than one authentication keys where each authentication key has multiple subscriber identifications.

Figure 2B:
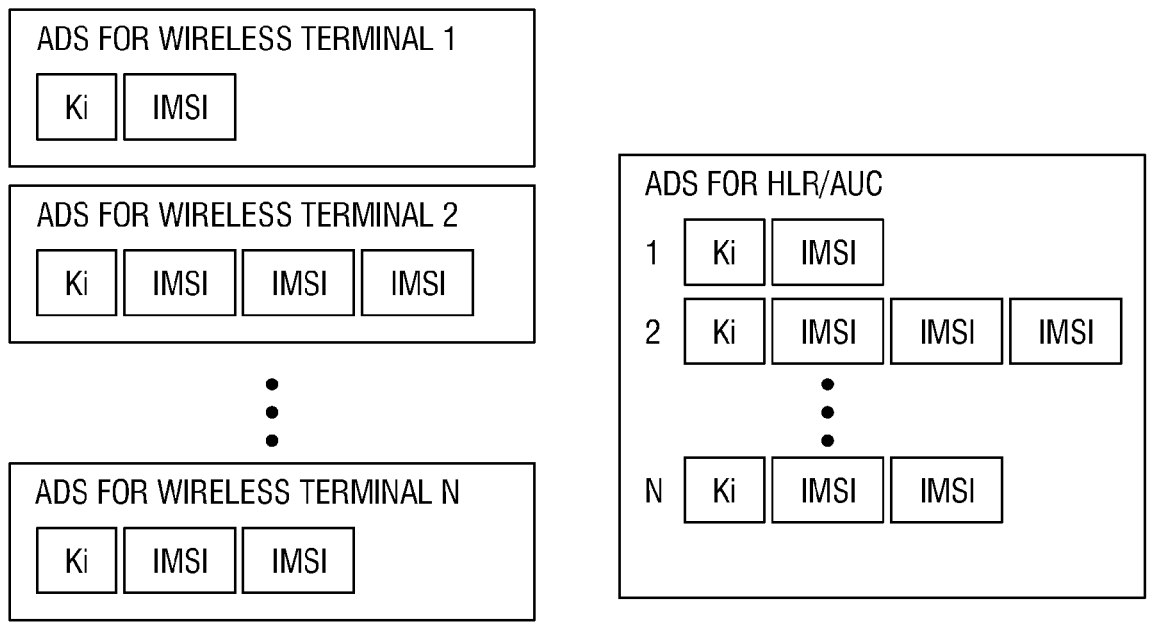
FIG. 2B illustrates an example of authentication data structures in another embodiment.

FIG. 2B illustrates an example of authentication data structures in another embodiment. Authentication data structure (ADS) for a wireless terminal includes a Ki and one or more IMSI's. In the example shown, the ADS for wireless terminal 1 includes one Ki and one IMSI. The ADS for wireless terminal 2 includes one Ki and three IMSI's. The ADS for wireless terminal N includes one Ki and two IMSI's. The ADS for HLR/AuC includes the Ki-IMSI entries for each of the wireless terminals. Entries for wireless terminal 1, 2, and N are shown.

Figure 3:
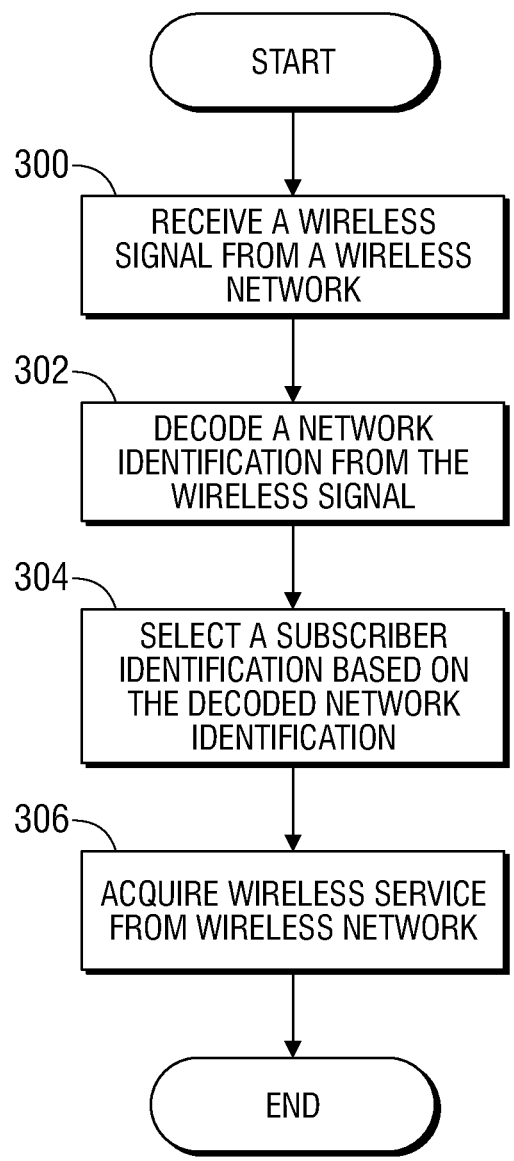
FIG. 3 is a flow diagram illustrating an embodiment of a process for acquiring wireless service from a wireless network.

FIG. 3 is a flow diagram illustrating an embodiment of a process for acquiring wireless service from a wireless network. In some embodiments, the process of FIG. 3 is implemented on a wireless terminal such as wireless terminal 100 in FIG. 1. In the example shown, in 300 a wireless signal is received from a wireless network. A wireless terminal receives wireless signals from a nearby network base station. In 302, a network identification is decoded from the wireless signal. The wireless signal includes a mobile network identification. For example, the wireless terminal scans for the existing wireless system signals. When it finds a network system broadcast control channel (e.g. BCCH in GSM Systems), it decodes the broadcasted information to decode the Location Area Identifier (LAI). The LAI is composed of a mobile country code, a mobile network code and a location area code. From the LAI, the wireless terminal can determine the country in which it is operating. In 304, a subscriber identification is selected based on the decoded network identification. For example, LAI information can be matched with the subscriber identification of the wireless terminal, which includes a mobile country code, a mobile network code, and a mobile subscriber identification number. In various embodiments, the LAI mobile country code and subscriber identification mobile country code are matched or the LAI mobile network code and the subscriber identification mobile network code are matched. In various embodiments, the selection of a subscriber identification is based at least in part on the pricing of different wireless networks, the billed account for that connection, a billed account for the wireless service, the application that will use the connection, an application using the wireless service (for example, one subscriber identification for data communication and a different subscriber identification for voice communication) or any other appropriate criteria for selecting a subscriber identification. In 306, wireless service is acquired from the wireless network.

Figure 4A:
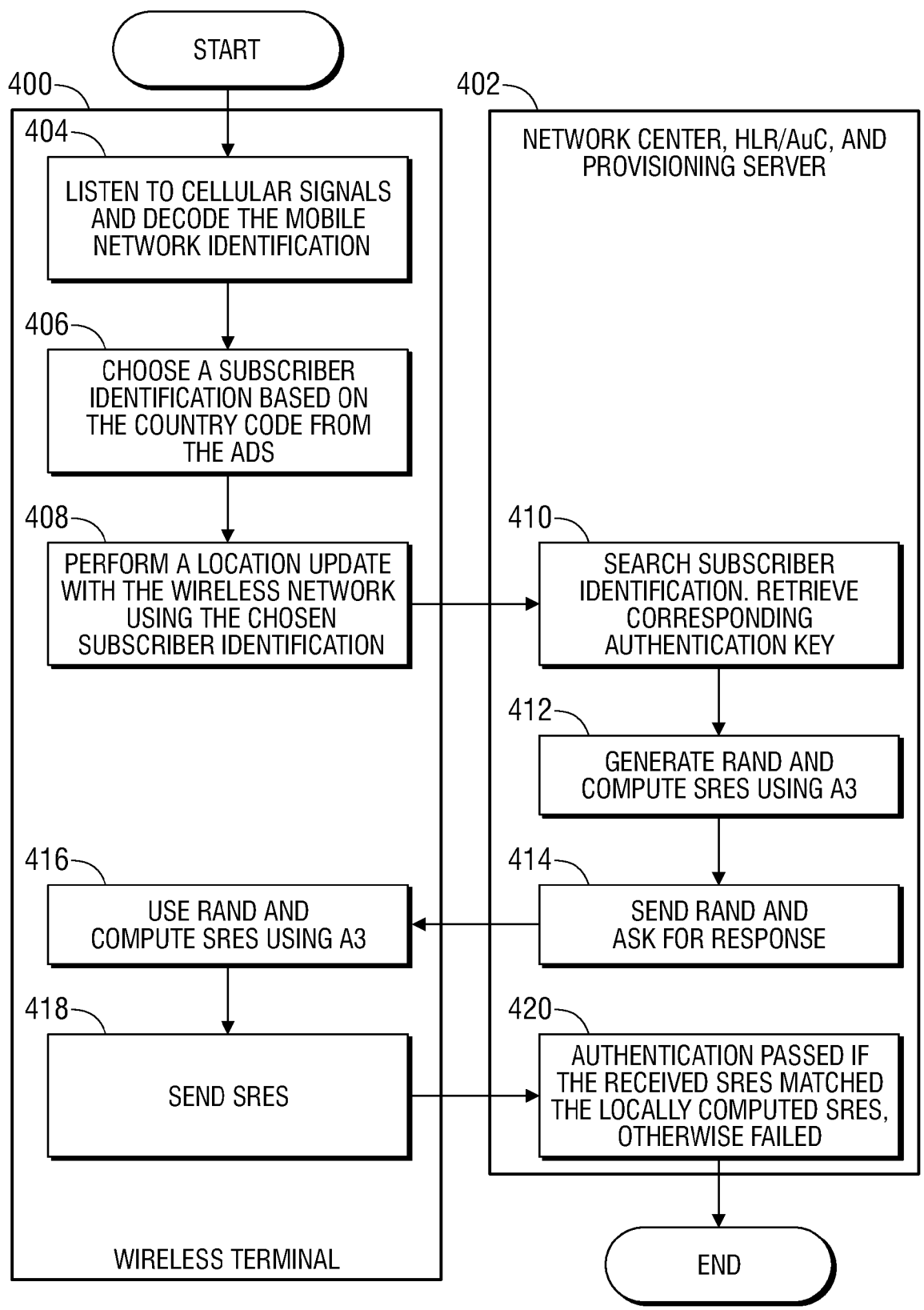
FIG. 4A illustrates an embodiment of a process for provisioning or authentication of a wireless terminal in a network system.
Figure 4B:
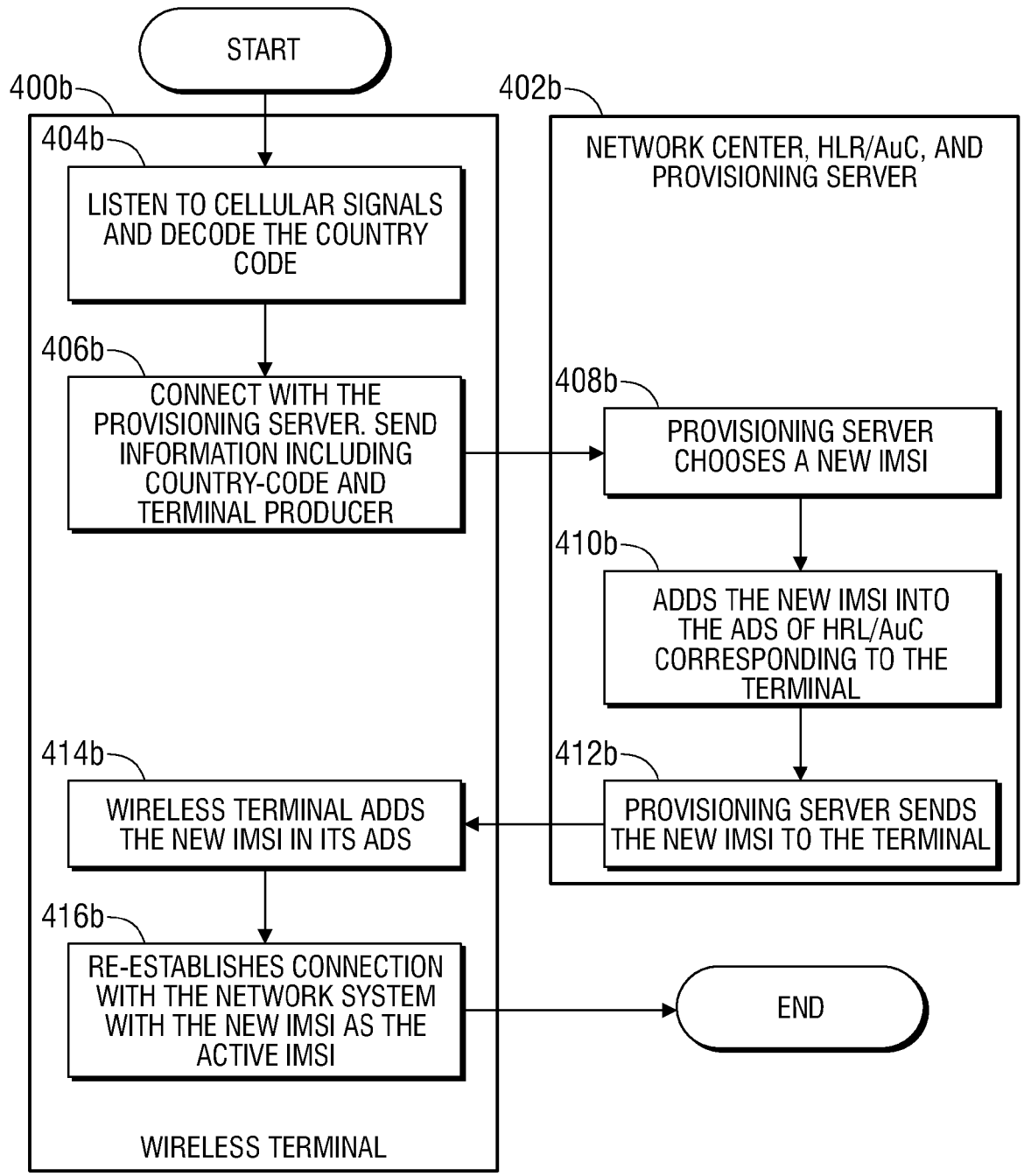
FIG. 4B illustrates another embodiment of a process for provisioning or authentication of a wireless terminal in a network system.

FIG. 4A illustrates an embodiment of a process for provisioning subscriber identification to a wireless terminal in a network system. Referring also to FIG. 1, in the example shown, wireless terminal 100 receives information from and transmits information to wireless network center 106 (and its associated HLR), HLR/AuC 108, and provisioning server 110 using wireless signals 102. As shown in FIGS. 4A and 4B, wireless network center 106 (and its associated HLR), HLR/AuC 108, and provisioning server 110 are collectively identified by numeral 402. In 404, wireless terminal 100 listens to wireless signals 102 transmitted from network base stations 104 and decodes the mobile network identification from the transmitted information. For example, the wireless terminal scans for the existing wireless system signals. When it finds a network system broadcast control channel (e.g. BCCH in GSM Systems), it decodes the broadcasted information to decode the Location Area Identifier (LAI). The LAI is composed of a mobile country code, a mobile network code and a location area code. From the LAI, the wireless terminal can determine the country in which it is operating. The wireless terminal receives a set of Subscriber Identification from network center, HLR/AuC, and provisioning server 402 and stores in its ADS. In 406, the wireless terminal chooses a Subscriber Identification with the same country code from its ADS. For example, the Subscriber Identification is composed of a mobile country code, a mobile network code, and mobile subscriber identification number. The codes in the Subscriber Identification can be used to match a Subscriber Identification to the local network and/or country. The rest of the Subscriber Identifications stored in the wireless terminal's ADS may be made inactive for the duration of the session.

In 408, the wireless terminal performs a location update with the visited wireless network using the new Subscriber Identification. In 410, the network center, HLR/AuC, and provisioning server 402 searches for the Subscriber Identification in its ADS and retrieves the corresponding Authentication Key. In 412, a challenge is generated (RAND) and with the Authentication Key is used to calculate a Response (SRES) using an authentication algorithm (A3). In 414, the RAND is sent to the wireless terminal and a response is requested. In 416, the wireless terminal uses the RAND with the Authentication Key from its ADS to independently calculate a SRES using encryption algorithm (A3) stored in its SIM. In 418, the SRES is sent to the network center and/or HLR/AuC and/or provisioning server 402. In 420, authentication is passed if the received SRES matches the locally computed SRES, otherwise the authentication fails.

FIG. 4B illustrates another embodiment of a process for provisioning subscriber identification to a wireless terminal in a network system. In some cases, the wireless terminal will not contain an IMSI that matches the country code of the local network system. The wireless terminal can connect to the network using an IMSI with another country code and then receiving or downloading a local IMSI (i.e. with a matching country code). In the example shown, wireless terminal 400B receives information from and transmits information to the network center, HLR/AuC, and provisioning server 402B using cellular signals. In 404B, wireless terminal 400B listens to cellular signals transmitted from network towers and decodes the country code from the transmitted information. In 406B, wireless terminal 400B communicates, after being authenticated, with the provisioning server transmitting information including a country code and a terminal producer. In 408B, the provisioning server chooses a new IMSI with a local country code. In 410B, the new IMSI is added to the ADS of the HLR/AuC (or the HLR associated with the network system) corresponding to the wireless terminal (i.e. paired with the wireless terminal's Ki). In 412B, the provisioning server sends the new IMSI to wireless terminal 400B. In 414B, wireless terminal 400B adds the new IMSI to its ADS. In 416B, wireless terminal 400 reestablishes its connection with the network system with the new IMSI as the active IMSI. In some embodiments, depending on the information transmitted (i.e. IMSI range or type of wireless terminal), communication may be established between the wireless terminal and a specific application server (i.e., a global platform provider's provisioning server or another server). In some embodiments, this communication with a specific application server is encrypted.

Figure 5:
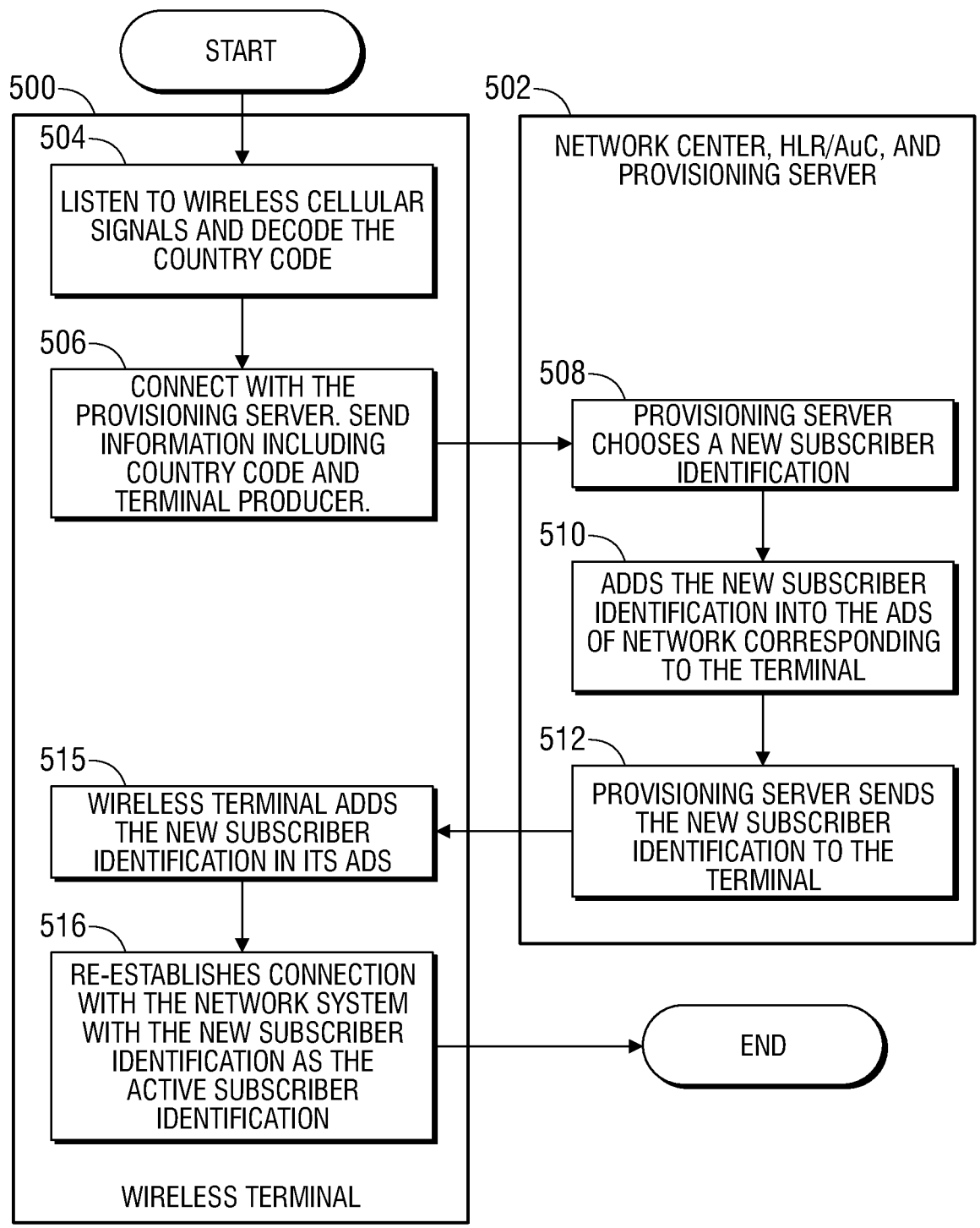
FIG. 5 illustrates an embodiment of a process for self-provisioning or authentication, of a wireless terminal in a network system.

FIG. 5 illustrates an embodiment of a process for provisioning subscriber identification to a wireless terminal in a network system. In some embodiments, the wireless terminal will not contain a Subscriber Identification that matches the network code and/or country code of the local network system. The wireless terminal can connect to the network using a Subscriber Identification with another network/country code and then receiving downloading a local Subscriber Identification (i.e. with a matching country code). Referring also to FIGS. 1 and 4A, in the example shown, wireless terminal 100 receives information from and transmits information to network center 106 (and its associated HLR), HLR/AuC 108, and provisioning server 110 using wireless signals 102. In 504, wireless terminal 100 listens to wireless signals transmitted from network base stations 104 and decodes the mobile network identification from the transmitted information similar to 404 of FIG. 4A. In 506, wireless terminal 100 communicates, after being authenticating using a process similar to 408-420 of FIG. 4A, with the provisioning server 110 transmitting information including a country code and a terminal producer. In 508, the provisioning server 110 chooses a new Subscriber Identification with a local country code and/or network code. In 510, the new Subscriber Identification is added to the ADS of the HLR/AuC 108 or the HLR associated with the visited network corresponding to the wireless terminal (i.e. paired with the wireless terminal's Authentication Key). In 512, the provisioning server 110 sends the new Subscriber Identification to wireless terminal 500. In 515, wireless terminal 100 adds the new Subscriber Identification to its ADS. In 516, wireless terminal 100 reestablishes its connection with the network system with the new Subscriber Identification as the active Subscriber Identification. In some embodiments, depending on the information transmitted (e.g., subscriber identification range or type of wireless terminal), communication may be established between the wireless terminal and a specific application server (e.g., a global platform provider's provisioning server or another server). In some embodiments, this communication with a specific application server is encrypted.

Figure 6:
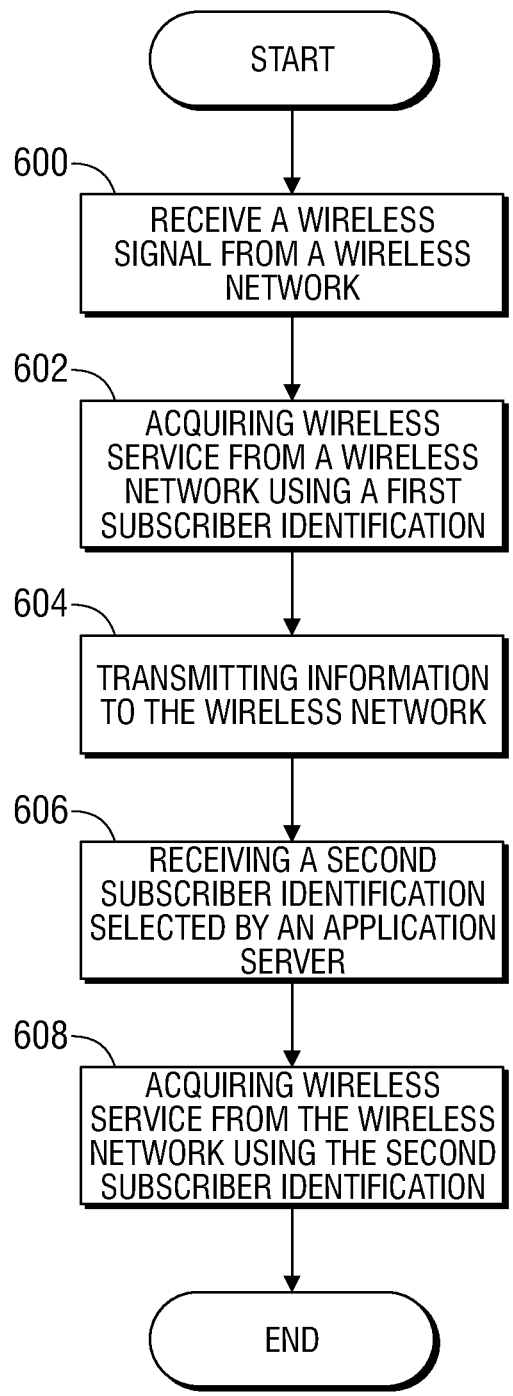
FIG. 6 is a flow diagram illustrating an embodiment of a process for acquiring wireless service from a wireless network.

FIG. 6 is a flow diagram illustrating an embodiment of a process for acquiring wireless service from a wireless network. In the example shown, in 600 a wireless signal is received from a wireless network. In 602, wireless service is acquired from the wireless network using a first subscriber identification. In 604, information is transmitted to the wireless network. In 606, a second subscriber identification, which is selected by an application server (or provisioning server 110 of FIG. 1), is received. The second subscriber identification is selected based at least in part on one or more of the following: the wireless network, the wireless network identification, the base station that the wireless terminal is communicating with, the local country associated with the network, or any other appropriate criteria for selecting a subscriber identification. In various embodiments, the first subscriber identification and the second subscriber identification are both paired with a single authentication key or the first subscriber identification is paired with a first authentication key and the second subscriber identification is paired with a second authentication key. In some embodiments, a second authentication key is received. In various embodiments, the subscriber identification and/or the authentication key are received after having been encrypted and need to be decrypted after having been received. In some embodiments, the subscriber identification is encrypted and decrypted using an authentication key. In various embodiments, a subscriber identification and/or a authentication key is encrypted in an application server, in a provisioning server, in a wireless network server, or in a combination of an application/provisioning server and a wireless network server, or in any other appropriate place for the encryption. In various embodiments, a subscriber identification and/or an authentication key is decrypted in a wireless terminal, in a SIM card, or in a combination of the SIM card and the wireless terminal, or in any other appropriate place for the decryption. In some embodiments, authentication information is received—for example, a random number that has been encrypted using an authentication key, a subscriber identification that has been encrypted using an authentication key, or other information that has been encrypted using an authentication key or other appropriate key. In 608, wireless service is acquired from the wireless network using the second subscriber identification.

Wireless Communication Provisioning Using State Transition Rules

Wireless communication provisioning using state transition rules associated with an identifier is disclosed. A first state associated with one or more identifiers is defined. A second state associated with one or more identifiers is defined. A state transition rule is defined between the first and second states. In some embodiments, the one or more identifiers are stored in a subscriber identity module (SIM). In some embodiments, a plurality of states are defined, a plurality of state transition rules are defined, and a group of states and transition rules are selected and associated with one or more identifiers. In some embodiments, wireless communications comprise mobile data, mobile cellular communications, or any other appropriate wireless communications.

In some embodiments, a customer organization defines a sequence of states for devices that communicate data with a global platform provider's application server via one or more wireless carrier networks. The provider (e.g., the global platform provider) enables the communication via the wireless carrier networks. The plurality of states enables the activity of provisioning of a customer device or provider device used in the data communication with appropriate billing, access, and/or authorization for each activity especially with regard to testing, activation, deactivation, etc.

Figure 7:
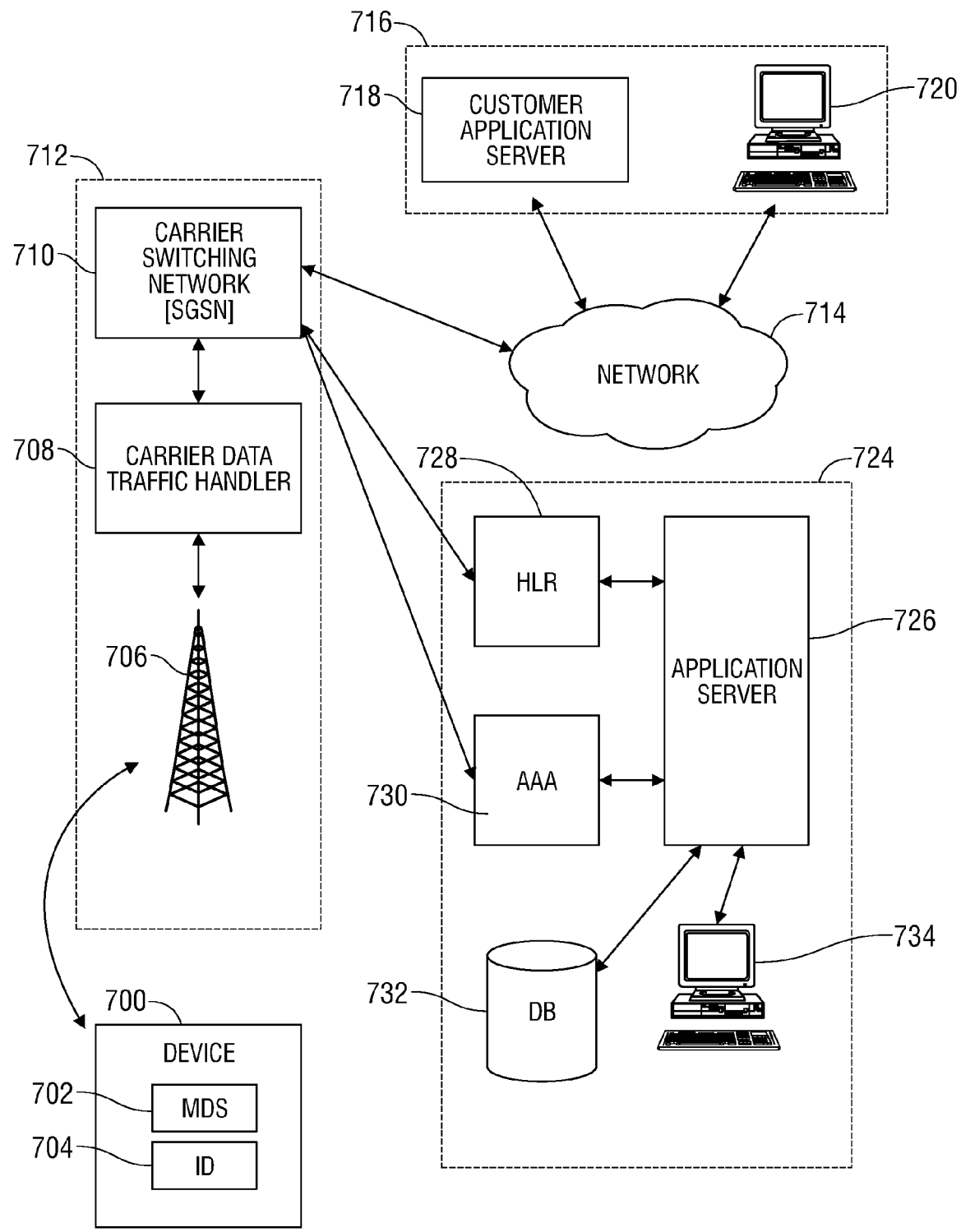
FIG. 7 illustrates a block diagram of an embodiment of a system for mobile data communication provisioning.

FIG. 7 illustrates a block diagram of an embodiment of a system for mobile data communication provisioning. In the example shown, device 700 comprises a mobile device that communicates data. Device 700 includes a mobile data service (MDS) 702—for example, general packet radio service—and an identifier (ID) 704—for example, a subscriber identifier (such as IMSI). Data can be transmitted and received by device 700 using MDS 702. Device 700 is identified using ID 704 and associated with a user or customer. Transmissions and receptions of data communicate with carrier network 712, which is associated with MDS 702. In various embodiments, the carrier network associated with MDS 702 comprises a mobile carrier network, a cell phone network, a messaging network, wireless communication network, or any other appropriate network for communicating data to a mobile device.

Carrier network 712 includes carrier switching network 710 (e.g., SGSN—serving General Packet Radio Services (GPRS) support node—used in Global System for Mobile Communications (GSM) networks), carrier data traffic handler 708 (e.g., GRX—a GPRS roaming exchange and/or SS7—signaling system 7 system), and a plurality of carrier towers—represented in FIG. 7 by tower 706. Communications of data traffic to and from device 700 are received by carrier network 712 by a carrier tower, which communicates the data traffic with carrier data traffic handler 708. Carrier data traffic handler 708 communicates data traffic with carrier switching network 710. Carrier switching network 710 can communicate with network 714, and Authentication Center/Home Location Register (HLR) 728 and Authentication, Authorization, and Accounting (AAA) Server (e.g., a Radius server) 730 of provider system 724. In one embodiment, provider system 724 is operated by a global platform provider as a control center.

Network 714 enables communication with customer system 716, which includes customer application server 718 and customer administrator 720. In some embodiments, network 714 comprises the internet, a local area network, a wide area network, a wired network, a wireless network, or any other appropriate network or networks for communicating with customer system 716. Customer application server 718 receives data from and transmits data to device 700 regarding the customer's services or products. In various embodiments, the customer's services includes transaction related services, monitoring services, and/or location tracking services. In some embodiments, a state transition rule defining transition from one provisioning state to another provisioning state associated with device 700 is implemented on customer application server 718. In some embodiments, a state transition rule defining transition from one provisioning state to another provisioning state associated with device 700 is not known to device 700.

Provider system 724 includes HLR 728, AAA server 730, application server 726, database (DB) 732, administrator 734. In an embodiment where the provider system 724 is the control center of a global platform provider, application server 726 can perform the function of a provisioning server, such as provisioning server 110 of FIG. 1, in addition to other functions. Provider system 724 enables customer services by enabling data communication services via the carrier network with device 700. HLR 728 enables communication with the provider system by indicating if device 700 is allowed to have data communication through carrier network 712 with customer system 716. AAA server 730 enables specific permissions that are available regarding data communications between device 700 and customer system 716 via carrier network 712. Application server 726 enables provisioning and billing for the provider. Provisioning comprises enabling devices such as device 700 to have mobile data communication services using a mobile carrier network. DB 732 includes information related to provisioning and billing for the provider. Administrator 734 administrates provider system. Customer system administrator 720 communicates with provider application server 726 to administrate customer system usage, billing, provisioning for data communication service of carrier network 712 enable by provider 724. In some embodiments, functionality of HLR 728 and AAA server 730 are performed by the same server, are partitioned between two servers but not exactly as described herein, or any other server configuration to achieve the same functionality.

FIG. 8 is a flow diagram illustrating an embodiment of a process for mobile data communication provisioning. In some embodiments, the process of FIG. 8 helps provision device 700 of FIG. 7 such that mobile data and/or wireless communications is available via carrier network 712 to customer system 716. In the example shown, in 800 states associated with one or more identifiers are defined. States that are associated with one or more identifiers can include test ready, inventory, activation ready, activated, deactivated, retired, return merchandise authorization (RMA), suspend, fraud review, purged, and/or any other appropriate states. In various embodiments, the identifier can be an International Circuit Card Identifier (ICCID), an international mobile subscriber identifier (IMSI), a customer identifier, a user identifier, or a device identifier. In various embodiments, the one or more identifiers comprises an identifier associated with a user, a customer, a company, an organization, etc. or a group of identifiers associated with a user, a customer, a company, an organization, etc.

In some embodiments, one or more states are based on the lifecycle of the service of a wireless communication device.

A test ready state can be used to allow a manufacturer to test a SIM, or a device with a SIM, and its network communication infrastructure before delivering the SIM, or device with a SIM, to an end user, a retail location, or a distributor. A test ready state can be a default state for a SIM that allows authentication and authorization with a global platform provider's HLR and AAA server, but does not have any billing associated with it. A SIM in a test ready state is able to conditionally transact data, voice, and/or Short Message Service (SMS) communications—for example, some limits may be placed on the communications while in this state such as: communication may occur up to a maximum data transmitted/received amount or up to a maximum number of days since the initial data communication. A test ready state may have no prerequisite state, have no limitation to a next state (e.g., all states allowed as next state), have no exclusivity rule, be a required state, and be allowed to have automatic and/or manual transitions.

An inventory state can be used to allow a SIM to be placed in a device and associated with an identifier of the device (e.g., a terminal identifier or a point of sale terminal identifier). An inventory state cannot coexist with an activation ready state. An inventory state cannot connect with the network and requires a manual change in order to change state. An inventory state may have a test ready state as a prerequisite, have no limitation to a next state (e.g., all states allowed as next state), have an exclusivity rule in that it cannot coexist with an activation ready state, not is a required state, and be allowed only to have manual transitions.

An activation ready state can be used to allow a SIM to be ready to be activated. An activation ready state will authenticate and authorize with the HLR and AAA server of the provider system, but no billing will occur. After the first data communication (e.g., first packet data protocol (PDP) context communication), the SIM state will automatically change to an activated state. An activation ready state may have a test ready state or inventory state as a prerequisite, have no limitation to a next state (e.g., all states allowed as next state), have an exclusivity rule in that it cannot coexist with an inventory state, not be a required state, and be allowed to have an automatic transition to an activated state or a manual transition to other states.

An activated state can be used to allow a SIM, or a device with a SIM, to be used by a user. In an activated state the SIM will authenticate and authorize on the HLR and AAA server of the provider system. Billing commences immediately on changing to this state. The provider system may check to make sure that the proper information is contained on the provider system's HLR and AAA server databases as well as the billing databases. In some cases, the checks will include checking the identifiers stored in the SIM (e.g., international mobile subscriber identifier (IMSI), customer identifier, device identifier, etc.). An activated state may have a test ready state, inventory, or activation ready state as a prerequisite, have possible next states of deactivated, purged, or retired, have no exclusivity rule, not be a required state, and be only allowed to have a manual transition to a next state.

A deactivated state can be used to allow a SIM, or a device with a SIM, to be deactivated by the user. In a deactivated state the SIM will not be allowed to authenticate and will not be billed. The AAA server of the provider system and the gateway GPRS support node (GGSN) of carrier networks will be sent a notification (e.g., a packet) informing them that the SIM has been deactivated. An deactivated state may have an activated state as a prerequisite, have possible next states of activated, purged, or retired, have no exclusivity rule, not be a required state, and be only allowed to have a manual transition to a next state.

A retired state can be used to allow a SIM, or a device with a SIM, to be retired by the provider or the user. In a retired state the SIM will not be allowed to authenticate and billing ends. A retired state may have any state as a prerequisite except purged, have any possible next states (i.e., all states possible), have no exclusivity rule, not be a required state, and be only allowed to have a manual transition to a next state.

A purged state can be used to allow a SIM, or a device with a SIM, to be purged by the provider. In a purged state the SIM will not be allowed to authenticate and the subscriber identification is removed from the system (e.g., IMSI permanently removed from the HLR of the provider system). A purged state may have any state as a prerequisite, have no possible next states, have no exclusivity rule, not be a required state, and be not allowed to have any transitions to a next state.

In some embodiments, a state is defined by a customer. In some embodiments, the state is defined using an Internet-based service.

In some embodiments, a state definition does not support communication sessions and a transition to that state will terminate existing open communication sessions.

In some embodiments, a first wireless communication provisioning state allows a communication device to pass traffic without incurring any billing charges, and an associated state transition rule allows an automated transition to a second provisioning state where the second provisioning state incurs billing charges. In some embodiments, a first wireless communication provisioning state allows a communication device to pass traffic without incurring any billing charges, and an associated state transition rule allows an automated transition to the second provisioning state, where the second provisioning state does not allow the communication device to pass traffic.

In 802, state transition rule(s) between two states is/are defined. A transition from one state to another may occur automatically on a predetermined condition or manually. If the transition is based on a condition is met (e.g., upon first data communication—packet data protocol context established), the state will automatically change from one to another (e.g., activation ready state to activated state). In various embodiments, the transition condition is based on one or more of the following: a predetermined amount of elapsed time since a prior state transition, an amount of service usage above a predetermined amount of service usage, one or more service signalings, or any other appropriate condition. In various embodiments, the condition is based on an exclusivity rule, a state rule, a communication data transfer, or any other appropriate condition. A manual change from one state to another requires an intervention directly from the provider system—for example, an action through a manager portal, by uploading a file to the SIM or device with the SIM, or an application programming interface (API) call.

In various embodiments, a state transition rule can be defined for an individual device or a group of devices, or different rules can be defined for different individual devices or different groups of devices, or any other appropriate combination as appropriate for meeting the needs of a supplier of devices.

In some embodiments, a group of states are defined and a group of transition rules are defined, and then a selection of states and transition rules are associated with one or more identifiers.

In some embodiments, a customer selects a state transition rule. In some embodiments, a customer defines a state transition rule. In various embodiments, the state transition rule is selected and/or defined using an Internet-based service, using a local program interface, or any other appropriate manner of selecting and defining a state transition rule.

In some embodiments, a state transition rule when activated terminates existing communication sessions.

FIG. 9 is a block diagram illustrating an embodiment of a state definition. In some embodiments, a state is associated with an identifier—for example, a SIM, a device identifier (e.g., an international mobile equipment identifier), a vendor identifier, or any other appropriate identifier. In the example shown, a state definition includes state name, state description, required state flag, prerequisite state, allowed next state(s), exclusivity rule, and transition mode(s) available that describe conditions allowing transitions between states. For example, a test ready state has: a) a state name of test ready; b) a state description of SIM is able to tested in its operation with the network by a manufacturer in a limited manner without being billed; c) a required state flag indicating that the test ready state is required; d) there is no prerequisite state for the test ready state; e) allowed next states from test ready are inventory, activation ready, activated, retired, or purged; f) there is no exclusivity rule for the test ready state; and g) the transition modes available are automatic to either an inventory state or an activation ready state based on an exclusivity rule or manual change.

FIG. 10 illustrates an embodiment of a state transition rule definition. In various embodiments, a state transition rule definition is associated with a state associated with an identifier or an identifier. In the example shown, a state transition rule definition includes current state, transition condition, state transitioned to, and transition description. For example, a SIM can be manually changed from an inventory state to an activation ready state when the device that the SIM is in is deployed by selling the unit to a retail customer, by having a service provider place the unit in the field, or by any other appropriate manner. For another example, a SIM can be automatically changed from an activation ready state to an active state when a PDP context is established and data is communicated to and from the SIM, or device with the SIM in it.

Figure 11:
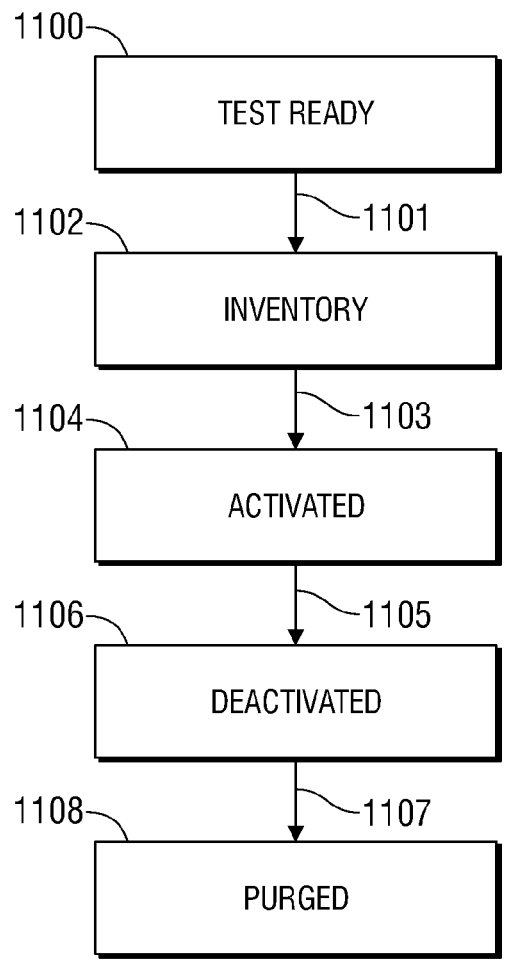
FIG. 11 is a flow diagram illustrating an embodiment of states of a channel sale model for provisioning and the transitions between the states.

FIG. 11 is a flow diagram illustrating an embodiment of states of a channel sale model for provisioning and the transitions between the states. In some embodiments, the starting default state of a SIM is the test ready state. In the example shown, in test ready state 1100 a device is ready for testing. The SIM is shipped in the test ready state to an original equipment manufacturer (OEM)—for example, a customer wanting to use the connectivity services provided by the provider which enables a user's device to have data communication to the customer via one or more carrier networks. In test ready state 1100, the SIM is allowed to provision and establish a PDP session (e.g., it can connect to GGSN of a carrier network, connect to internet, and connect to the customer's application server). When the SIM is in the test ready state, no billing to the OEM occurs. This connectivity is allowed for until the transition 1101. Transition 1101 from the test ready state is either a manually triggered transition or an automatically triggered based on a condition where the condition is the when the SIM has reached: 1) a maximum number of PDP sessions has occurred—for example, 10; 2) a maximum amount of data has been transmitted/received to and from the SIM/device via the carrier network—for example, 100 Kbytes; or 3) a maximum amount of time has elapsed since the first PDP context in this test ready state—for example, 90 days. When the transition is triggered, then the SIM switches to inventory state 1102.

In inventory state 1102, a device is waiting to be transferred to a user. In this state, no connectivity is enabled, and no billing occurs. The state is maintained until transition 1103. Transition 1103 occurs when the OEM or the customer or its channel service providers manually triggers a state change. When the state change is triggered, the SIM is changed to activated state 1104. In activated state 1104, a device is being used by user. In activated state 1104, the SIM is able to establish a PDP session and connect and transfer data to a customer application server via a carrier network. The user is billed for the service provided by the provider. Billing information is provided to the customer by gathering the relevant data from the network carriers and the provider's data bases. The SIM remains in the active state until triggered to transition. Transition 1105 may be triggered manually or automatically. In various embodiments, transition 1105 is triggered automatically by a maximum number of connections allowed, a maximum amount of data transferred, a maximum amount of time since the start of PDP sessions, or any other appropriate automatic trigger condition. In some embodiments, the user or the customer can also manually trigger transition 1105 to a deactivated state 1106.

In deactivated state 1106, a device is finished being used as requested by an end user or by a customer system request by being in a deactivated state. In deactivated state 1106, the SIM is not able to connect and establish a PDP session. While in deactivated state 1106, there is no billing for connectivity. Transition 1107 can be triggered automatically (e.g., after a period of time) or manually (e.g., by the customer). When transition 1107 is triggered, the SIM changes state to purged state 1108. In purged state 1108, the SIM and the device the SIM is in, is removed from the system. In purged state 1108, the SIM is not able to connect and establish a PDP session. There is no billing associated with the trigger or the state. Accounting for the customer may remove the item from inventory or asset lists. Purged state 1108 automatically removes the IMSI and International Circuit Card Identifier (ICCID) from the HLR of the provider system.

Figure 12:
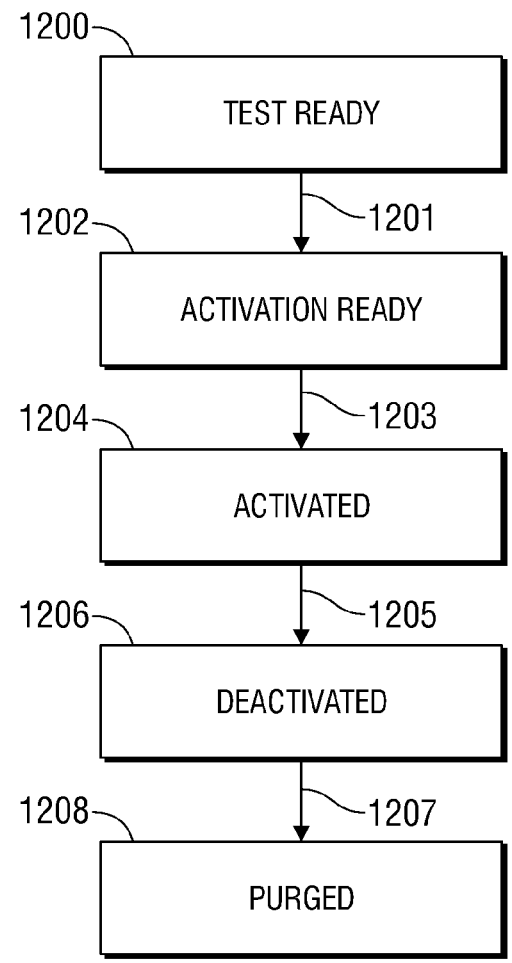
FIG. 12 is a flow diagram illustrating an embodiment of states of a retail sale model for provisioning and the transitions between the states.

FIG. 12 is a flow diagram illustrating an embodiment of states of a retail sale model for provisioning and the transitions between the states. The states and transitions in FIG. 12 are similar to the states and transitions in FIG. 11 except for the activation ready state. In some embodiments, the starting default state of a SIM is the test ready state. In the example shown, in test ready state 1200 a device is ready for testing. The SIM is shipped in the test ready state to an original equipment manufacturer (OEM)—for example, a customer wanting to use the connectivity services provided by the provider which enables a user's device to have data communication to the customer via one or more carrier networks. In test ready state 1200, the SIM is allowed to provision and establish a PDP session (e.g., it can connect to GGSN of a carrier network, connect to internet, and connect to the customer's application server). When the SIM is in the test ready state, no billing to the OEM occurs. This connectivity is allowed for until the transition 1201. Transition 1201 from the test ready state is either a manually triggered transition or an automatically triggered based on a condition where the condition is the when the SIM has reached: 1) a maximum number of PDP sessions has occurred—for example, 5; 2) a maximum amount of data has been transmitted/received to and from the SIM/device via the carrier network—for example, 1 Mbytes; or 3) a maximum amount of time has elapsed since the first PDP context in this test ready state—for example, 1 year. When the transition is triggered, then the SIM switches to activation ready state 1202.

In activation ready state 1202, a device is waiting to be transferred to a user. In various embodiments, the activation ready state is set after testing by the OEM when the device is being shipped from the OEM to retail locations, distribution partners, directly to end users, or when the SIM, or device with the SIM, is about to be in the end users hands but is not ready to have billing/service fully implemented. In this state, SIM connectivity is enabled, and a PDP session can be established. Upon the first PDP session occurring transition 1203 is triggered. When the state change is triggered, the SIM is changed to activated state 1204. In activated state 1204, a device is being used by user. In activated state 1204, the SIM is able to establish a PDP session and connect and transfer data to a customer application server via a carrier network. The user is billed for the service provided by the provider. Billing information is provided to the customer by gathering the relevant data from the network carriers and the provider's data bases. The SIM remains in the active state until triggered to transition. Transition 1205 may be triggered manually or automatically. In various embodiments, transition 1205 is triggered automatically by a maximum number of connections allowed, a maximum amount of data transferred, a maximum amount of time since the start of PDP sessions, or any other appropriate automatic trigger condition. In some embodiments, the user or the customer can also manually trigger transition 1205 to a deactivated state 1206.

In deactivated state 1206, a device is finished being used as requested by an end user or by a customer system request by being in a deactivated state. In deactivated state 1206, the SIM is not able to connect and establish a PDP session. While in deactivated state 1206, there is no billing for connectivity. Transition 1207 can be triggered automatically (e.g., after a period of time) or manually (e.g., by the customer). When transition 1207 is triggered, the SIM changes state to purged state 1208. In purged state 1208, the SIM and the device the SIM is in, is removed from the system. In purged state 1208, the SIM is not able to connect and establish a PDP session. There is no billing associated with the trigger or the state. Accounting for the customer may remove the item from inventory or asset lists. Purged state 1208 automatically removes the IMSI and International Circuit Card Identifier (ICCID) from the HLR of the global platform provider system.

Figure 13:
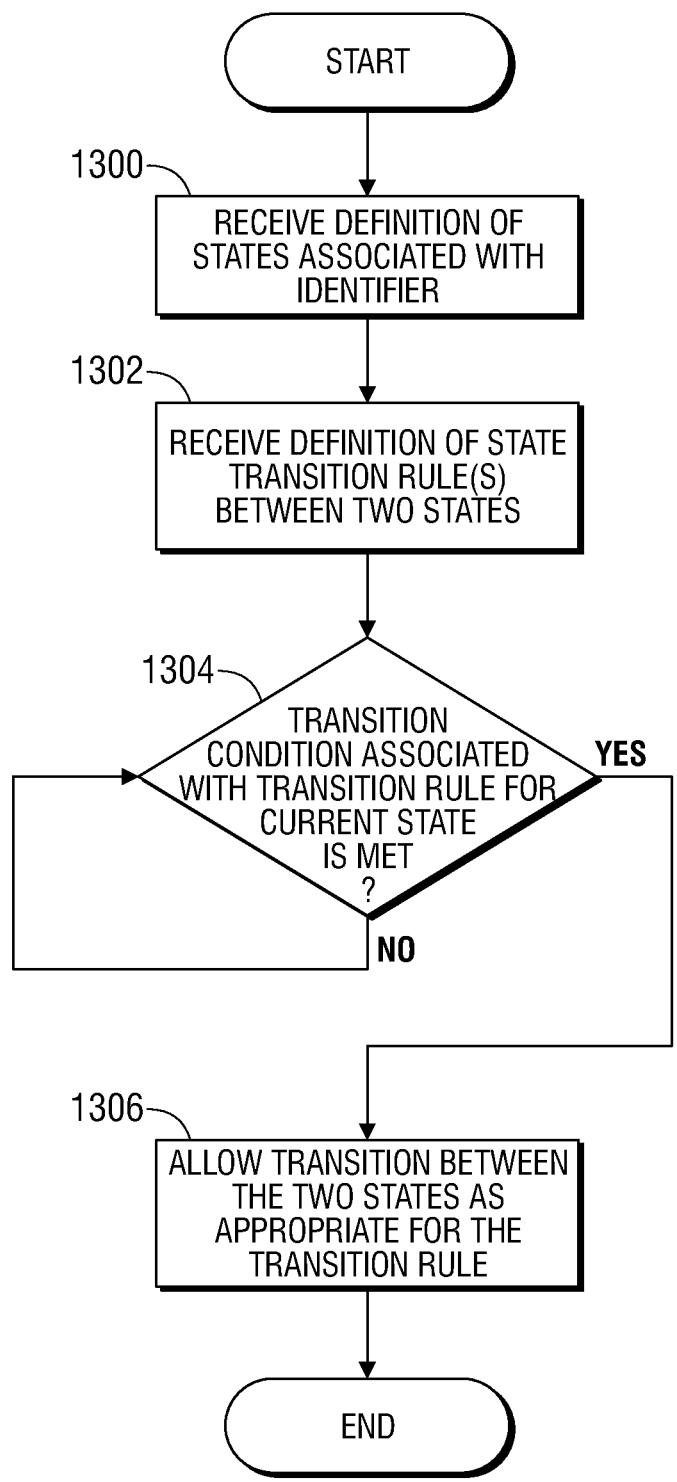
FIG. 13 is a flow diagram illustrating an embodiment of a process for provisioning wireless communication.

FIG. 13 is a flow diagram illustrating an embodiment of a process for provisioning wireless communication. In the example shown, in 1300 definitions for states associated with an identifier are received. In some embodiments, state definitions and/or selections are received using an internet-based application. In various embodiments, state definitions are the same or different for different identifiers. In various embodiments, a state for provisioning (e.g., a device) allows billing, allows communication sessions, allows activation, does not allow billing, does not allow communication sessions, does not allow activation, or any other appropriate action associated with a state. In 1302, definition(s) for state transition rule(s) between two states is/are received. In some embodiments, state transition rule definitions and/or selections are received using an internet-based application. In various embodiments, the transitions are automatic or manual and are triggered with a transition condition. In various embodiments, the automatic and/or manual transition conditions include an elapsed time from a prior state, prior transition, or prior specific/any communication, an absolute time, an absolute date, after a predetermined amount of traffic, before a predetermined level of traffic is reached, after communication with a specific location, number, device, service center, after sending a service indication, a system message, after receipt of a service message, condition, communication from a specific location, device, server, service center, or any other appropriate transition condition. In 1304, it is determined if a transition condition associated with a transition rule for current state is met. In the event that an appropriate transition condition has not been met, control stays with 1304. In the event that an appropriate transition condition is met, then in 1306 allow transition between the two states as appropriate for the transition rule. In some embodiment, the implementation of provisioning states, state transition rule enforcement, and evaluation of transition conditions takes place on a server that communicates with a wireless network and wireless device. In one embodiment, the server is located in, or otherwise operated by, a global platform provider's control center.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system operating in a mobile wireless network comprising:
   a first home location register HLR containing a plurality of subscriber identifications, the first home location register associated with a local region or network of the mobile wireless network; and
   a provisioning server coupled to the first HLR and configured to communicate with the mobile wireless network including a plurality of mobile switching centers MSCs and a plurality of mobile devices operating in the mobile wireless network, wherein the provisioning server:
      is arranged to receive a signal from the mobile wireless network specifying a location of a first mobile device having a first subscriber identification and operating in the mobile wireless network under appropriate first criteria, the location being a roaming location relative to the local region or network,
      is configured to provision the first HLR to add a second subscriber identification corresponding to the first mobile device and the location, the second subscriber identification selectably assigned for a roaming network different to the local region or network when it is determined that a mismatch exists between the first subscriber identification and a network code for the roaming network in which the first mobile device has moved and is active, and
      is arranged to transmit data identifying the second subscriber identification to the first mobile device to allow the first mobile device to make the second subscriber identification the active subscriber identification for the first mobile device thereby to allow the first mobile device to re-establish connection and to operate in the mobile wireless network in the roaming network under appropriate second criteria different to the first criteria, the second criteria selected to avoid roaming charges for the first wireless device during its time in the roaming network; and wherein
   the second subscriber identification is selected based at least in part on one or more of the following:
      i) the roaming network,
      ii) the roaming network identification,
      iii) a base station with which the first mobile device is communicating, and/or
      iv) a local country associated with the roaming network;
   and wherein the first HLR is configured to communicate authentication data to the mobile wireless network to allow the first mobile device to operate under the second criteria in the mobile wireless network.

2. The system of claim 1, wherein the first HLR is configured to communicate authentication data to one of the MSCs operating in the mobile wireless network so that the first mobile device operates under the second criteria in the mobile wireless network.

3. The system of claim 1, wherein a subscriber identification includes a country code.

4. The system of claim 1, wherein a subscriber identification includes a network code.

5. The system of claim 1, wherein a subscriber identification includes a country code and at least one network code.

6. The system of claim 1, wherein a subscriber identification includes an International Mobile Subscriber Identity IMSI.

7. A method of operating a mobile wireless network having a plurality of mobile switching centers "MSCs", a plurality of mobile devices operating in the mobile wireless network and a first home location register HLR containing a plurality of subscriber identifications, the first home location register associated with a local region or network of the mobile wireless network, the method comprising:
   at a provisioning server coupled to a first HLR and configured to communicate with the mobile wireless network, receiving a signal from a mobile wireless network specifying a location of a first mobile device having a first subscriber identification and operating in the mobile wireless network under first criteria, the location being a roaming location relative to the local region or network;
   provisioning a first home location register HLR by the provisioning server to add a second subscriber identification corresponding to the first mobile device and the location, the second subscriber identification selectably assigned for a roaming network different to the local region or network when it is determined that a mismatch exists between the first subscriber identification and a network code for the roaming network in which the first mobile device has moved and is active; and
   transmitting data identifying the second subscriber identification to the first mobile device to allow the first mobile device to make the second subscriber identification the active subscriber identification for the first mobile device thereby to allow the first mobile device to re-establish connection and to operate in the mobile wireless network in the roaming network under second criteria different to the first criteria, the second criteria selected to avoid roaming charges for the first wireless device during its time in the roaming network, and wherein
   the second subscriber identification is selected based at least in part on one or more of the following:
      i) the roaming network,
      ii) the roaming network identification,
      iii) a base station with which the first mobile device is communicating, and/or
      iv) a local country associated with the roaming network;
   and wherein the first HLR communicates authentication data to the mobile wireless network so that the first mobile device operates under the second criteria in the mobile wireless network.

8. The method of claim 7, wherein the first HLR communicates authentication data to one of the MSCs operating in the mobile wireless network so that the first mobile device operates under the second criteria in the mobile wireless network.

9. The method of claim 7, wherein a subscriber identification includes a country code.

10. The method of claim 7, wherein a subscriber identification includes a network code.

11. The method of claim 7, wherein a subscriber identification includes a country code and at least one network code.

12. The method of claim 7, wherein a subscriber identification includes an International Mobile Subscriber Identity IMSI.

* * * * *